Figure 1:
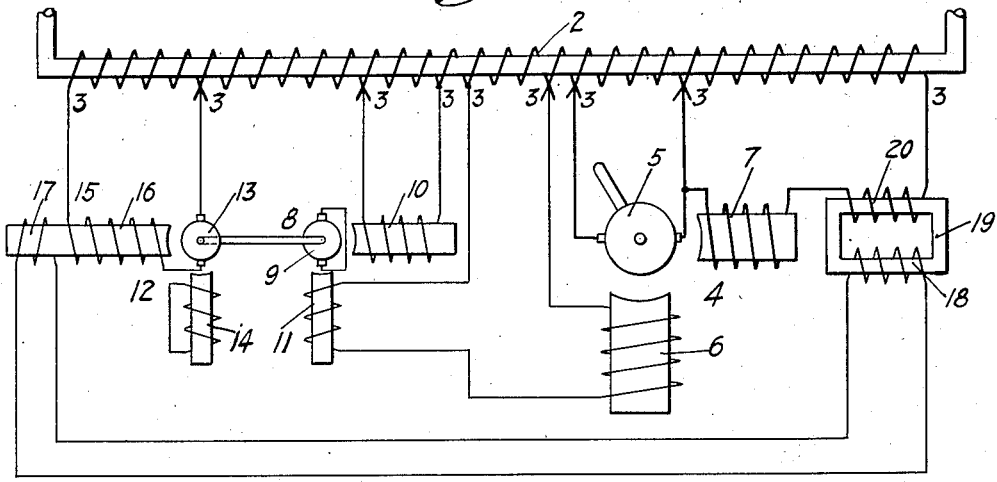

R. E. HELLMUND.
SYSTEM OF CONTROL.
APPLICATION FILED APR. 29, 1915.

1,298,704.

Patented Apr. 1, 1919.
2 SHEETS—SHEET 1.

WITNESSES:
Chas. Fornander
D. C. Davis

INVENTOR
Rudolf E. Hellmund.
BY
Wesley J. Carr
ATTORNEY

R. E. HELLMUND.
SYSTEM OF CONTROL.
APPLICATION FILED APR. 29, 1915.
1,298,704.
Patented Apr. 1, 1919.
2 SHEETS—SHEET 2.
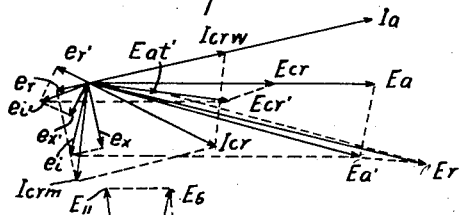
Fig. 2.
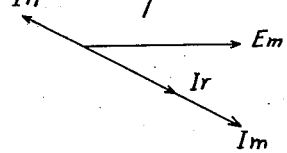
Fig. 3.
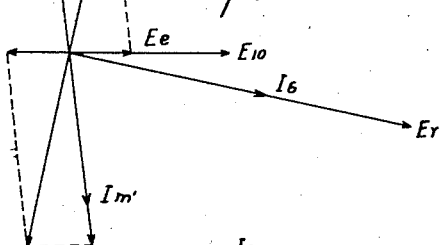
Fig. 4.
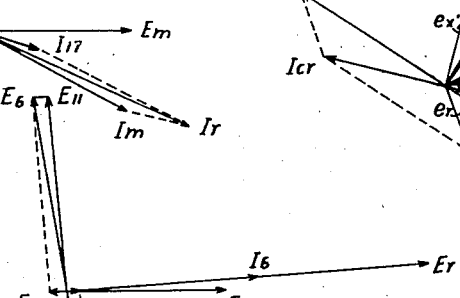
Fig. 6.
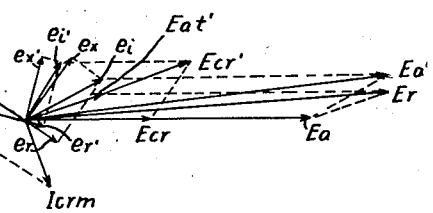
Fig. 5.
Fig. 7.
WITNESSES:
Fred. A. Lind
D. C. Davis
INVENTOR
Rudolf E. Hellmund
BY
Wesley G. Carr
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,298,704. Specification of Letters Patent. Patented Apr. 1, 1919.

Application filed April 29, 1915. Serial No. 24,736.

*To all whom it may concern:*

Be it known that I, RUDOLF E. HELLMUND, a subject of the Emperor of Germany, and a resident of Pittsburgh, in the county of Allegheny and State of Pennsylvania, have invented a new and useful Improvement in Systems of Control, of which the following is a specification.

My invention relates to the control of independently excited alternating-current commutating motors or generators particularly adapted for railway use, and it has for an object to provide means whereby a machine of the character specified may be caused to have operating characteristics similar to those of direct-current series machines during motor operation.

Further objects of my invention are to provide means whereby sparking at the commutator may be suppressed and the power factor of the machine may be readily adjusted under all conditions of operation, and whereby the amount of energy returned to the line during regeneration may be automatically controlled.

In the operation of an extensive system of electrical distribution, such, for example, as an interurban electric-railway system, it is desirable, for economic reasons, to employ alternating currents. When a great range of speed is desired in the vehicles of a system of this character, no type of alternating-current motor has given any marked degree of success except the commutating type. Commutating alternating-current motors may be designed to have either shunt or series operating characteristics, the latter being preferable for heavy traction purposes. I have previously disclosed, in applications No. 19,460 and No. 24,740, filed, respectively, on April 6, 1915, and April 29, 1915, and assigned to the Westinghouse Electric & Manufacturing Company, a method of controlling the power factor of commutating alternating-current motors having shunt operating characteristics by means of the phase adjustment of a separate exciting current. Briefly speaking, said method comprises energizing the magnetizing-field winding of the motor in question from a source of electromotive force de-phased substantially 90° with respect to the electromotive force of the main source and slightly varying the strength and phase of said exciting electromotive force for phase correction. The magnitude of said exciting electromotive force may be varied by any suitable means, as, for example, by varying the speed or the excitation of an auxiliary exciting machine producing the same, and the phase thereof may be altered by combining, for example, with a small electromotive force derived directly from the source. In this application, I disclose a method of obtaining similar power-factor control in motors having series characteristics.

Figure 1 of the accompanying drawing is a diagrammatic view of a commutating alternating-current motor of the compensated type, together with its attendant control circuits, constructed in accordance with my invention, and Figs. 2 to 7, inclusive, are vector diagrams illustrating the operation of the system of Fig. 1.

Any convenient source of alternating current 2, such, for example, as the secondary winding of a transformer, is provided with a plurality of voltage taps 3—3, and the connections to said taps may be adjusted to vary the voltage impressed upon different portions of the consumption circuit. This adjustment may be made by any convenient apparatus, such, for example, as a controller of the ordinary type and, since it forms no part of the present invention, it has not been illustrated in detail. A series commutating machine 4 is provided with an armature 5, a main field winding 6 and a cross field winding 7. The cross field winding 7 is preferably provided with substantially twice the number of turns that are contained in the armature 5, in order that substantially half the load current of the armature may pass therethrough. An auxiliary exciting generator or phase shifter 8 of the short circuited armature type is provided to assist in the control of the excitation furnished by the main field winding 6. Briefly stated, the machine comprises a mechanically driven armature 8 of the direct-current type with the brushes thereof short-circuited, as is customary with repulsion motors. A main field winding 10 connected to the source of alternating current 2, produces an alternating magnetic field substantially in quadrature to the brushes. A cross field winding 11 is mounted substantially in line with the plane of commutation. Upon driving the armature by any convenient means, the current flow in the armature induces current flow in the cross field winding 11, said current being of the same frequency as the exciting current but differing therefrom by any desired phase angle that is dependent upon the location of the brushes relative to the field windings. A driving torque for the armature 9 is obtained from a motor 12, preferably of the inductively compensated, series commutating type. The motor 12 is provided with an armature 13, a short-circuited cross field winding 14, and a differentially wound main field winding 15, the two portions of which are denoted respectively as 16 and 17. The portion 16 is connected in series with the armature 13 across a fixed portion of the source 2 or across any other suitable constant-potential source of alternating current. The portion 17 of the field winding 15 is connected so as to be energized by the secondary member 18 of a transformer 19, the primary winding 20 of which is connected in series with the cross field winding 7 of the main motor 4. The main field winding 6 of the machine 4 is energized by a portion of the source 2 and by the inducing winding 11 of the generator 8, acting in series relation.

With the connections as above described the motor operation is as follows: Assuming the machine 4 to be operating at a definite speed, a portion of the load current thereof is traversing the primary winding 20 of the transformer 19 and inducing proportionate current in the secondary winding 18, which current flows through the portion 17 of the field winding 15. The differentially wound field winding 15 is so designed that the magnetizing effect of the portion 16 at all times predominates over the magnetizing effect of the portion 17.

Turning to Figs. 2, 3 and 4 for a detailed explanation of the operation of my system during motoring, the voltage impressed upon the main-machine-armature circuit is represented by the vector $Ea$ in Fig. 2 and $Ecr$ represents the voltage impressed upon the cross-field circuit. The armature current $Ia$ is assumed to be leading and $Icrw$ is the armature-current component which is transferred by transformer action into the cross-field circuit (assuming a transformer ratio of two to one between the cross-field winding and the armature winding, as is usual in doubly-fed motors). By combining said vector $Icrw$ with the vector $Icrm$ representing the cross-field magnetizing current, there is obtained the vector $Icr$ representing the resultant cross-field current. The vectors $er$, $ex$, and $ei$ are the ohmic, reactive and impedance drops respectively encountered by the armature current $Ia$; whereas the vectors $er'$, $ex'$, and $ei'$ represent the corresponding drops encountered by the cross-field current. By combining $ei'$ with vector $Ecr$, there is obtained the vector $Ecr'$, representing the cross-field voltage impressed upon the cross-field winding by transformer action. Since a transformer ratio of two to one has been assumed between the cross-field winding and the armature winding, but one-half of said voltage appears in the armature winding, being represented by the vector $Eat'$. The subtraction of the voltage $ei$ from $Ea$ produces the resultant armature voltage $Ea'$ and, by combining this voltage with the transformer voltage $Eat'$, there is obtained the rotational voltage $Er$, (the vector $Icrm$ being perpendicular to the vector $Ecr'$).

Fig. 3 is illustrative of the conditions in the small driving motor 12 and the vectors thereof bear the appropriate relations to the vectors of Fig. 2, being presented in a separate diagram only for the sake of clearness. The vector $Em$ represents the voltage impressed upon the working circuit including windings 16 and 13 and is in phase with the vector $Ea$ in Fig. 2. The working current of the motor 12 will, in general, lag behind the voltage and may be represented by the vector $Im$ which also represents the current flowing in the winding 16. The current in the winding 17 is purposely arranged to oppose that in the winding 16 and, being in phase with the main-motor, cross-field current $Icr$, may be represented by a vector $I_{17}$ (connections reversed). The resultant magnetizing field of the driving motor may, therefore, be represented by $Ir$ in Fig. 3. It is obvious that the greater the value of $Ira$, the greater will be $I_{17}$ and the smaller will be $Ir$.

Fig. 4 represents the conditions in the exciter machine and it also is shown separate from Fig. 2 for the sake of clearness. The vector $E_{10}$ represents the voltage impressed upon the field winding 10 and is in phase with the vector $Ea$ of Fig. 2. The current of the winding 10 is shown by the vector $Im'$, lagging somewhat less than 90° behind the vector $E_{10}$. The rotational voltage $Er$ is the same in Fig. 2 and the current $I_6$, in phase therewith, represents the magnetizing current in the magnetizing-field winding 6 of the main machine. The vector $E_{11}$, opposite in phase to the vector $Im'$, represents the rotational voltage induced in the exciter armature and transformed into the cross-field winding 11. The vector $Ee$ represents the small corrective voltage derived directly from the main transformer. The vector $E_6$ represents the resultant voltage of the main machine field circuit and leads the current $I_6$ by substantially 90°.

It will now be seen that any increase of the main motor current $Ia$ increases the main-motor, cross-field current $Icr$ and, in turn, the auxiliary-motor-exciting current $I_{17}$. This effect, in turn, decreases the resultant magnetizing-field of the small driving motor and increases the speed thereof, increasing the speed of the exciter set. There follows an increase of the voltages $E_{11}$ and $E_6$ and, consequently, of the main motor magnetizing current $I_6$, lowering the speed of the main motor. With an increase in the vector $E_{11}$ and with the vector $Ee$ remaining constant, the vector $E_6$ swings in a counter-clockwise direction and with it the vectors $I_6$ and $Er$. This, in turn, swings the vectors $Er$ and $Ea$ more nearly into phase with the vector $Ia$ and, therefore, reduces the lead of the load current. The opposite effect takes place with a load decrease in the main motor. In other words, the main motor furnishes increased leading current with decreased load which may be desirable in order to keep the armature current fairly constant and to cause the motor to furnish leading current to the line in substantially inverse ratio to its mechanical load.

While I have shown the excitation of the field winding 17 as varying in accordance with the load current through the instrumentality of the transformer 19, it is obvious that it might be connected directly in the load current circuit or in any other convenient and well known manner be caused to have its current vary in accordance with the load current of the motor 4.

The diagrams of Figs. 5, 6 and 7 represent the operation of the system of Fig. 1 during recuperation and correspond, respectively, to the diagrams of Figs. 1, 3 and 4, like vectors being similarly designated. The main motor is assumed to be operating recuperatively with a lagging power-factor and furnishing wattless current to the line. An increase in the vector $I_{17}$, which is in line with the vector $Icr$, increases the resultant magnetizing current of the small driving motor and decreases its speed. This, in turn, decreases the vectors $E_6$ and $I_6$, reducing the magnetizing field of the main motor. In other words, with decreased regenerative current, the magnetizing field of the main motor is reduced, producing the negative compound characteristic which is desired for stable regenerative control.

While I have shown my invention in its preferred form, it is obvious to those skilled in the art that it is susceptible of various minor additional changes and modifications without departure from the spirit thereof and I accordingly desire that no limitations shall be placed thereon except such as are imposed by the prior art or specifically set forth in the subjoined claims.

I claim as my invention:

1. The combination with a source of alternating current, of an alternating-current motor of the commutating type provided with a main field winding, connections from a portion of said source to the armature of said motor, circuits including both a portion of said source and an auxiliary source of alternating current for energizing said main field winding, and means whereby the voltage supplied by said auxiliary source is increased upon an increase in the motor load.

2. The combination with a source of alternating current, of an alternating-current motor of the commutating type provided with a main field winding, connections from a portion of said source to the armature of said motor, circuits including both a portion of said source and an auxiliary source of alternating current of like frequency to the main source but differing therefrom in phase for energizing said main field winding, and means whereby the voltage supplied by said auxiliary source is increased upon an increase in the motor load.

3. The combination with a source of alternating current, of an alternating-current motor of the commutating type provided with a main field winding, connections from a portion of said source to the armature of said motor, circuits including both a portion of said source and an auxiliary alternating current generator of the commutating type supplying current of like frequency to the main source but differing therefrom in phase, and means whereby the speed of said generator is increased when the load on said motor increases, whereby the strength of the main field of the motor is increased and the speed of the motor decreased.

4. The combination with a source of alternating current, of an alternating-current motor of the commutating type provided with a main field winding, connections from a portion of said source to the armature of said motor, circuits including both a portion of said source and an auxiliary alternating-current generator of the commutating type supplying current of like frequency to the main source but differing therefrom in phase, an auxiliary motor for driving said auxiliary generator provided with a differentially wound main field, means for energizing the predominating portion of said main field with substantially constant current, and means for energizing the subordinate portion of said main field in direction and in magnitude in proportion to the main motor current, whereby, upon an increase in the motor load, there results a more nearly complete neutralization of the dominant portion of the auxiliary motor field, a weakening of the resultant auxiliary motor field, an increase in the auxiliary motor speed and auxiliary generator voltage, a strengthening of the main motor field and a decrease in the main motor speed.

5. The combination with a source of alternating current, of a main motor provided with a magnetizing-field winding and arranged for recuperatively supplying current thereto, an auxiliary machine for supplying exciting current to the magnetizing-field winding of said motor, an auxiliary motor for driving said auxiliary machine, and means for automatically and inversely varying the speed of said auxiliary motor in accordance with changes in the amount of current supplied to said source by said main motor, whereby the amount of energy supplied to said source from said main motor may be maintained at a substantially constant amount.

6. The combination with a source of alternating current, of a main motor provided with a magnetizing-field winding and arranged for recuperatively supplying current thereto, an auxiliary machine for supplying exciting current to the magnetizing-field winding of said main motor, an auxiliary motor for driving said auxiliary machine, and means for automatically and inversely varying the speed of said auxiliary motor in accordance with changes in the amount of current supplied to said source by said main motor comprising a circuit for supplying variable excitation to the magnetizing field of said auxiliary motor in accordance with said load changes.

7. The combination with a source of alternating current, of an alternating-current main machine of the commutating type provided with a main field winding, connections from a portion of said source to the armature of said machine, circuits including an auxiliary generating machine for energizing said main field winding, auxiliary dynamo-electric driving means for said generating machine, and means whereby the speed of said driving means is varied in accordance with the main-machine load.

In testimony whereof, I have hereunto subscribed my name this 23rd day of April 1915.

RUDOLF E. HELLMUND.